United States Patent [19]
Fowler

[11] 3,791,114
[45] Feb. 12, 1974

[54] TWO ROW CUTTER WINDROWER HARVESTING MACHINE

[75] Inventor: Larry G. Fowler, Belle Glade, Fla.

[73] Assignee: Sugar Cane Growers Cooperative of Florida, Belle Glade, Fla.

[22] Filed: May 18, 1972

[21] Appl. No.: 254,372

[52] U.S. Cl.............. 56/13.9, 56/14.5, 56/59, 56/317
[51] Int. Cl............................................ A01d 45/10
[58] Field of Search ......... 56/13.5, 13.6, 13.7, 13.8, 56/13.9, 14.1, 14.2, 14.3, 14.5, 53, 56, 59, 63, 119, 315, 317, DIG. 2

[56] References Cited
UNITED STATES PATENTS

| | | | |
|---|---|---|---|
| 3,665,686 | 5/1972 | Duncan | 56/14.5 |
| 2,224,662 | 12/1940 | Thomson et al. | 56/14.5 |
| 3,492,798 | 2/1970 | Hart | 56/317 |
| 3,448,564 | 6/1969 | Chauffe | 56/14.3 |
| 3,673,774 | 7/1972 | Mizzi | 56/13.9 |
| 3,144,743 | 8/1964 | Gaunt et al. | 56/59 |
| 3,462,927 | 8/1969 | Quick | 56/56 |

FOREIGN PATENTS OR APPLICATIONS

| | | | |
|---|---|---|---|
| 1,134,061 | 11/1968 | Great Britain | 56/315 |

Primary Examiner—Antonio F. Guida
Attorney, Agent, or Firm—Nathaniel Humphries

[57] ABSTRACT

A sugar cane harvesting machine is disclosed including a tracked vehicle on which two identical row harvesting means are provided for two adjacent rows with the harvesting means including a lower cane chopper for chopping the cane of the row at ground level, a cane lifting and guiding scroll means for lifting fallen cane toward a vertical position and cutting tangles or mats incapable of vertical orientation to prevent uprooting of such cane forwardly of the lower cutting means, upper guide chains for guiding the tops of the vertically oriented cane to a cane top cutter where the tops are cut and guided to fall beneath the tracks of the vehicle; the lower cane cutting means includes kicker rolls operative to deflect the severed cane into an inverted U-shaped orienting chute in which the cane is oriented parallel to the rows with the cane from both rows being formed into a single windrow between the two rows being harvested.

29 Claims, 14 Drawing Figures

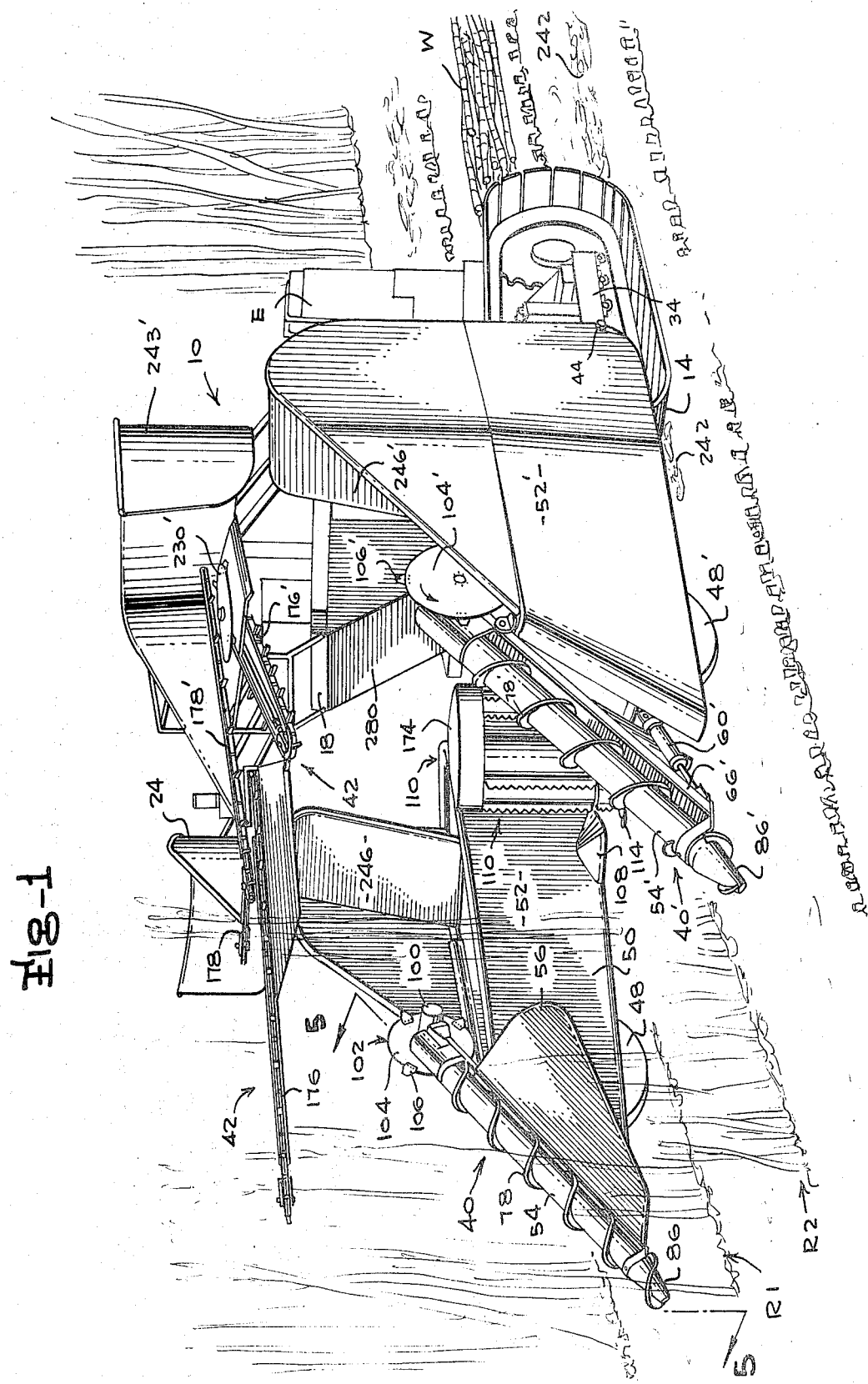

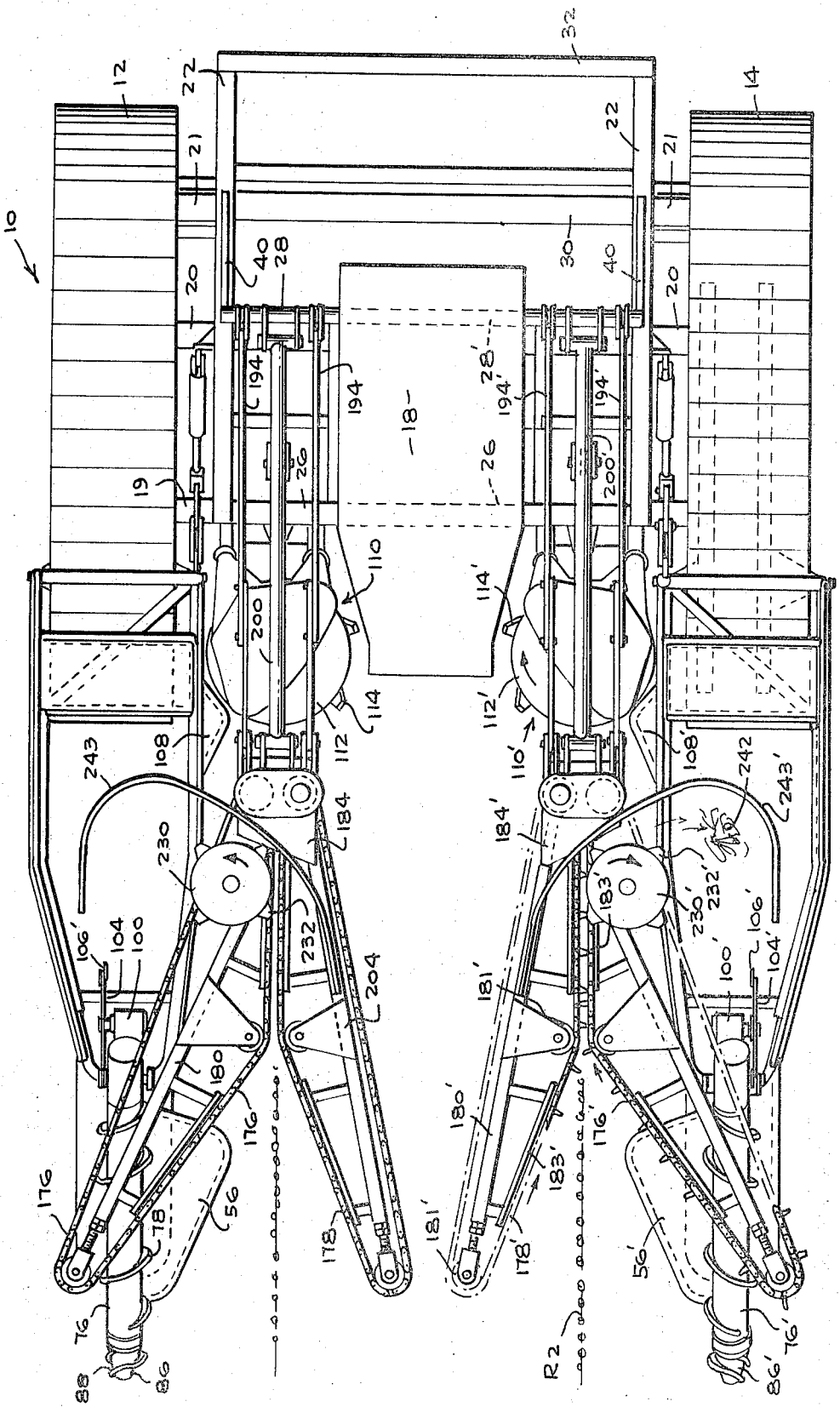

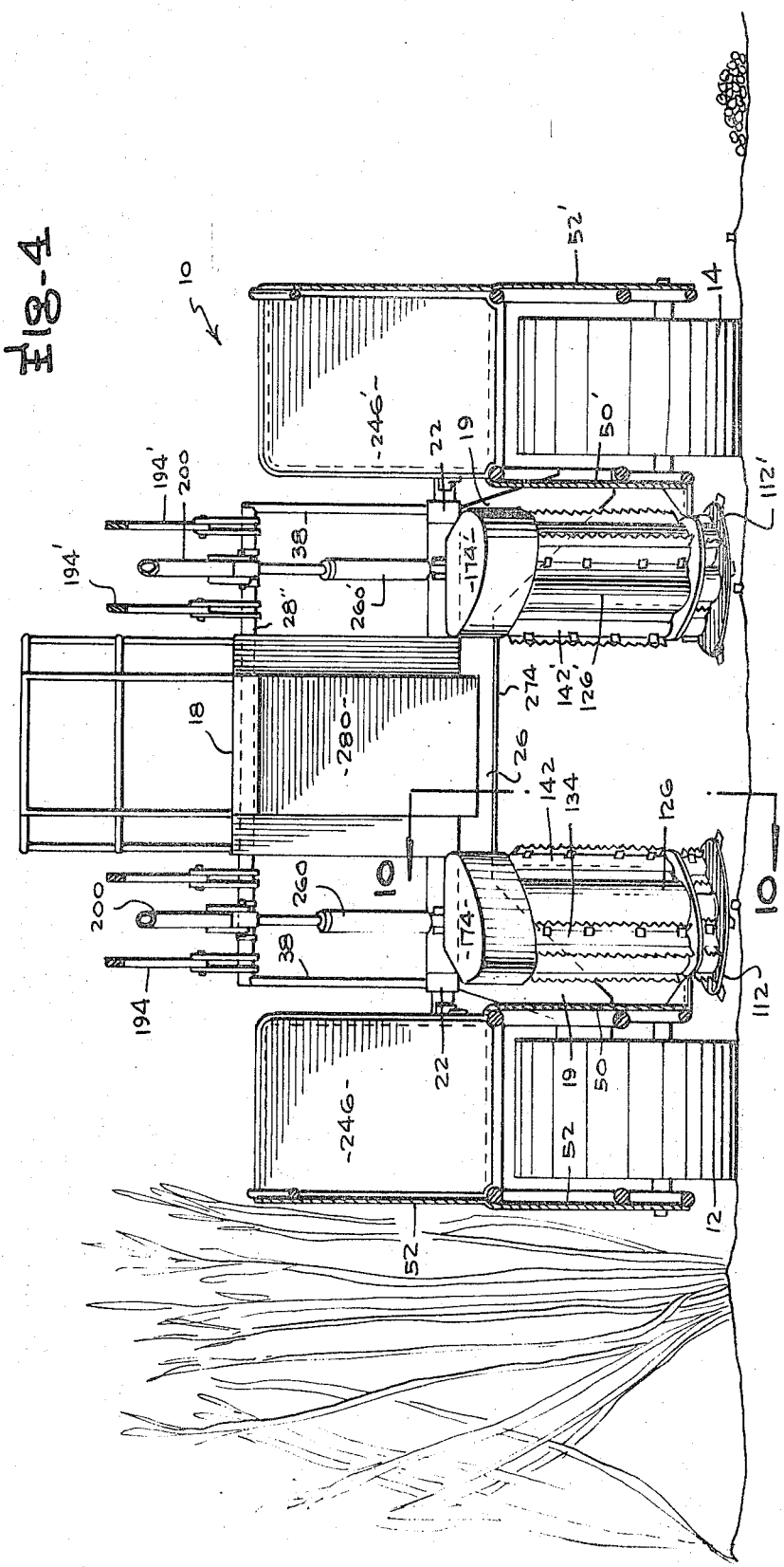

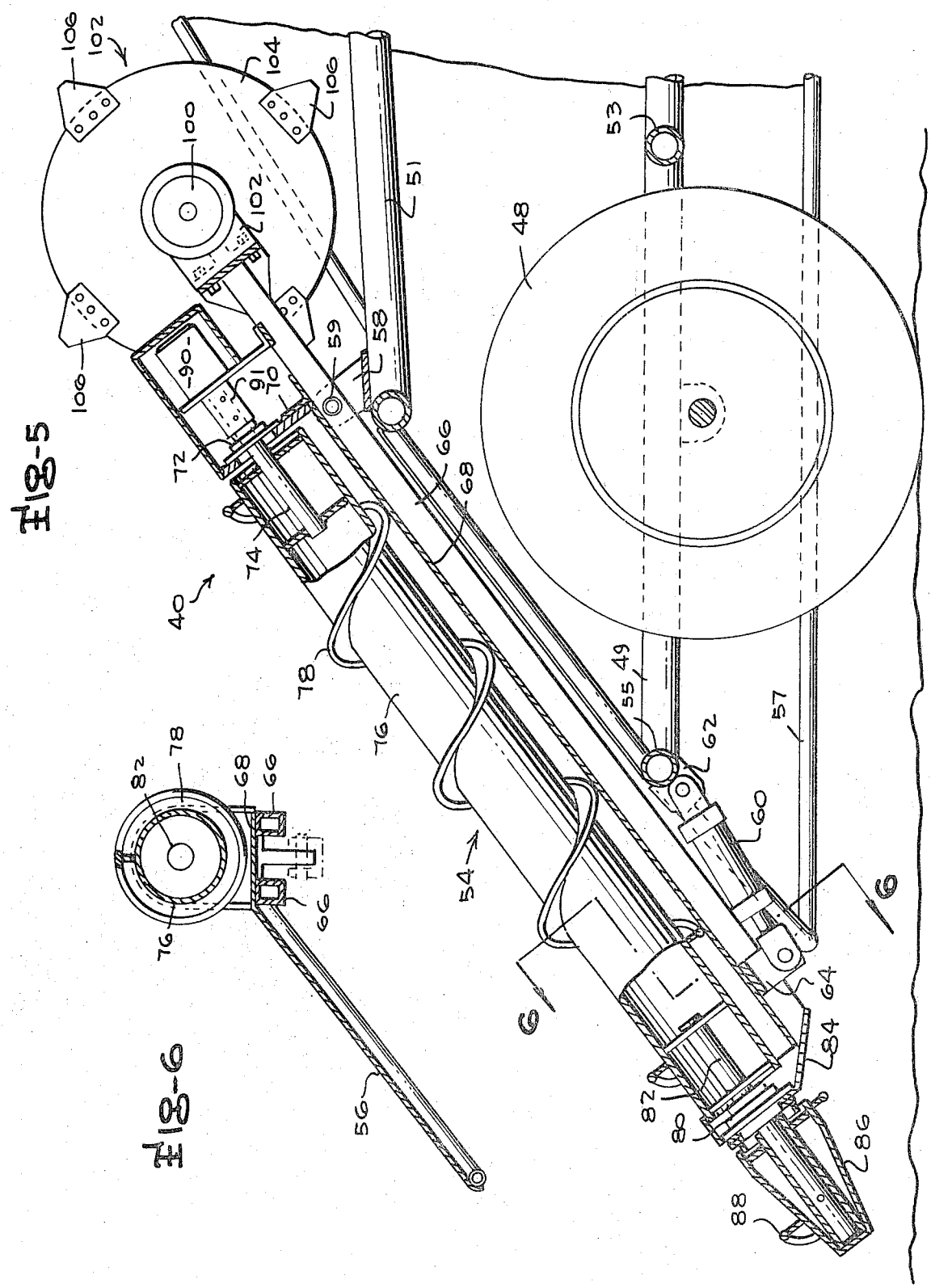

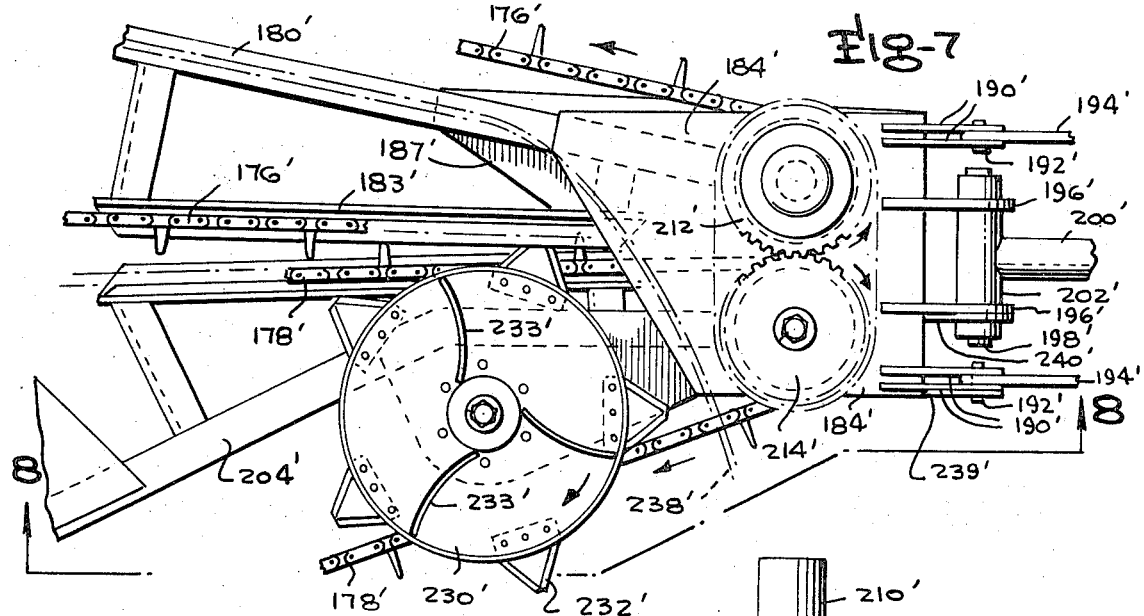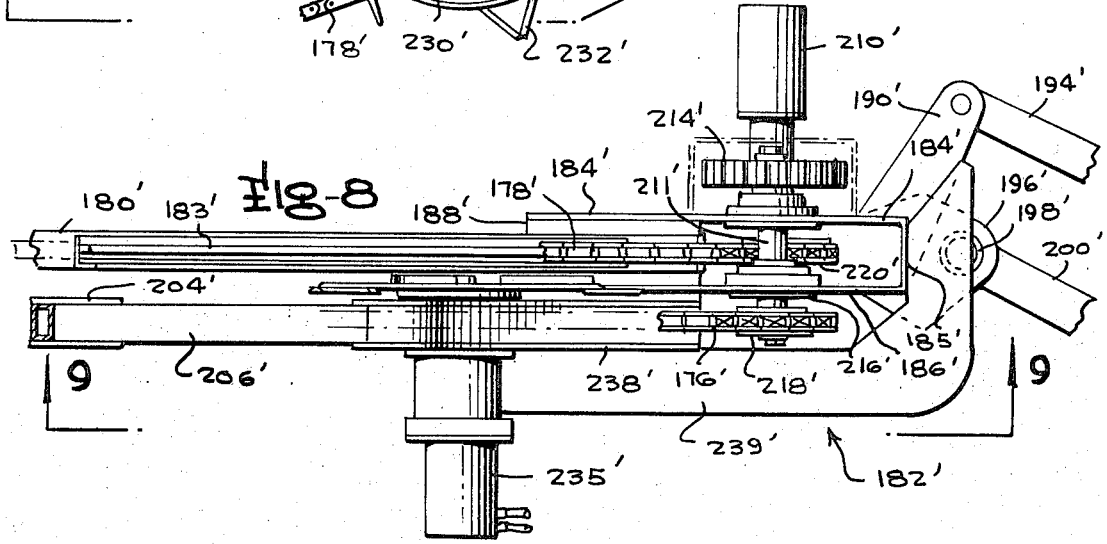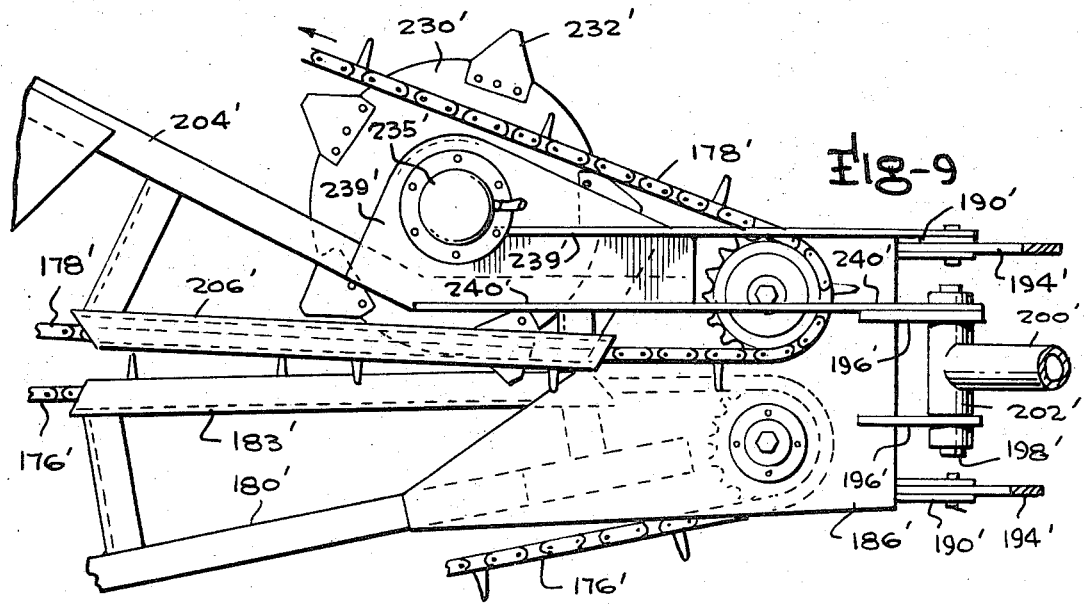

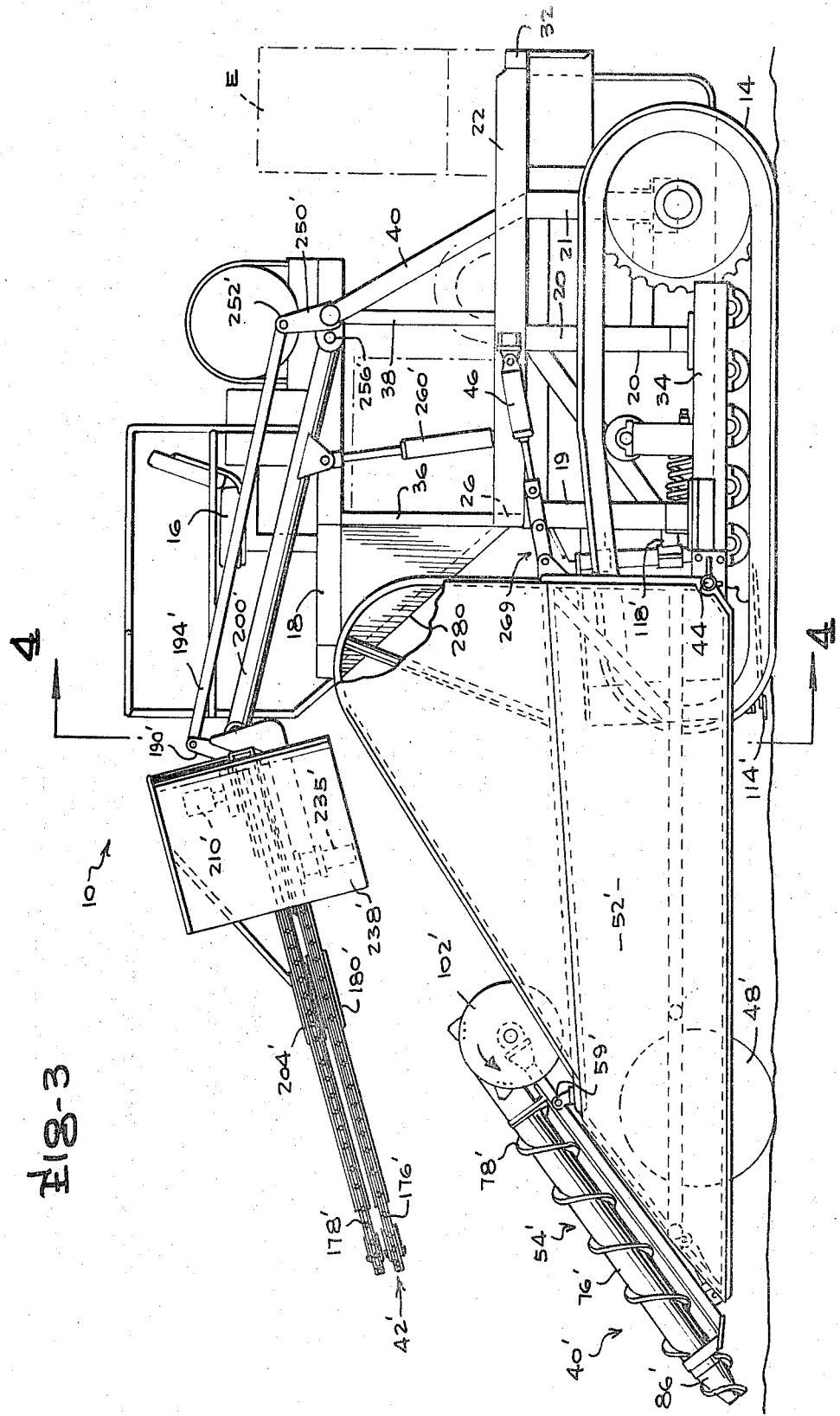

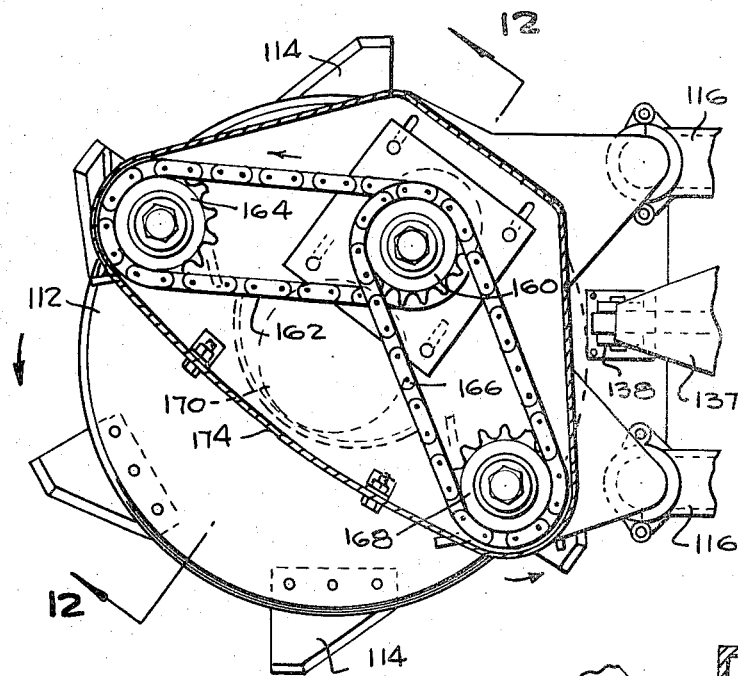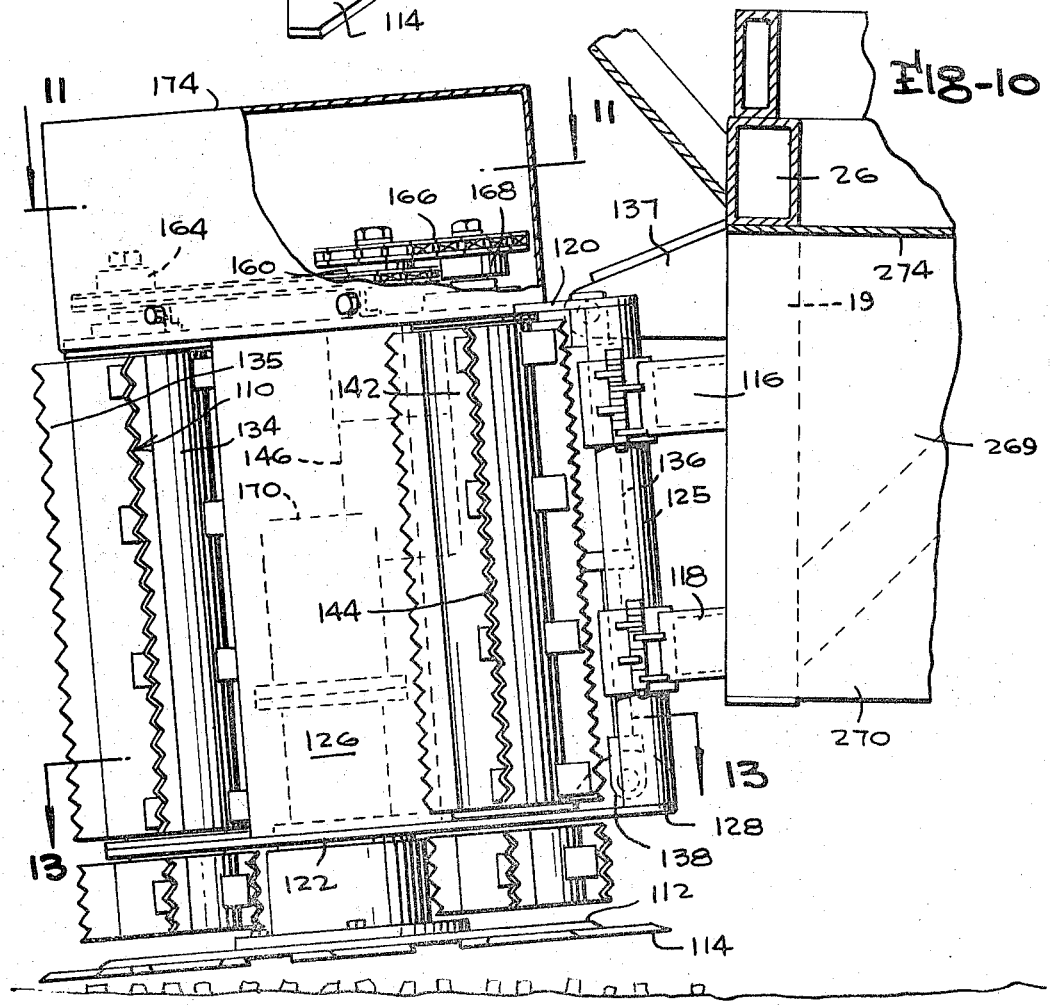

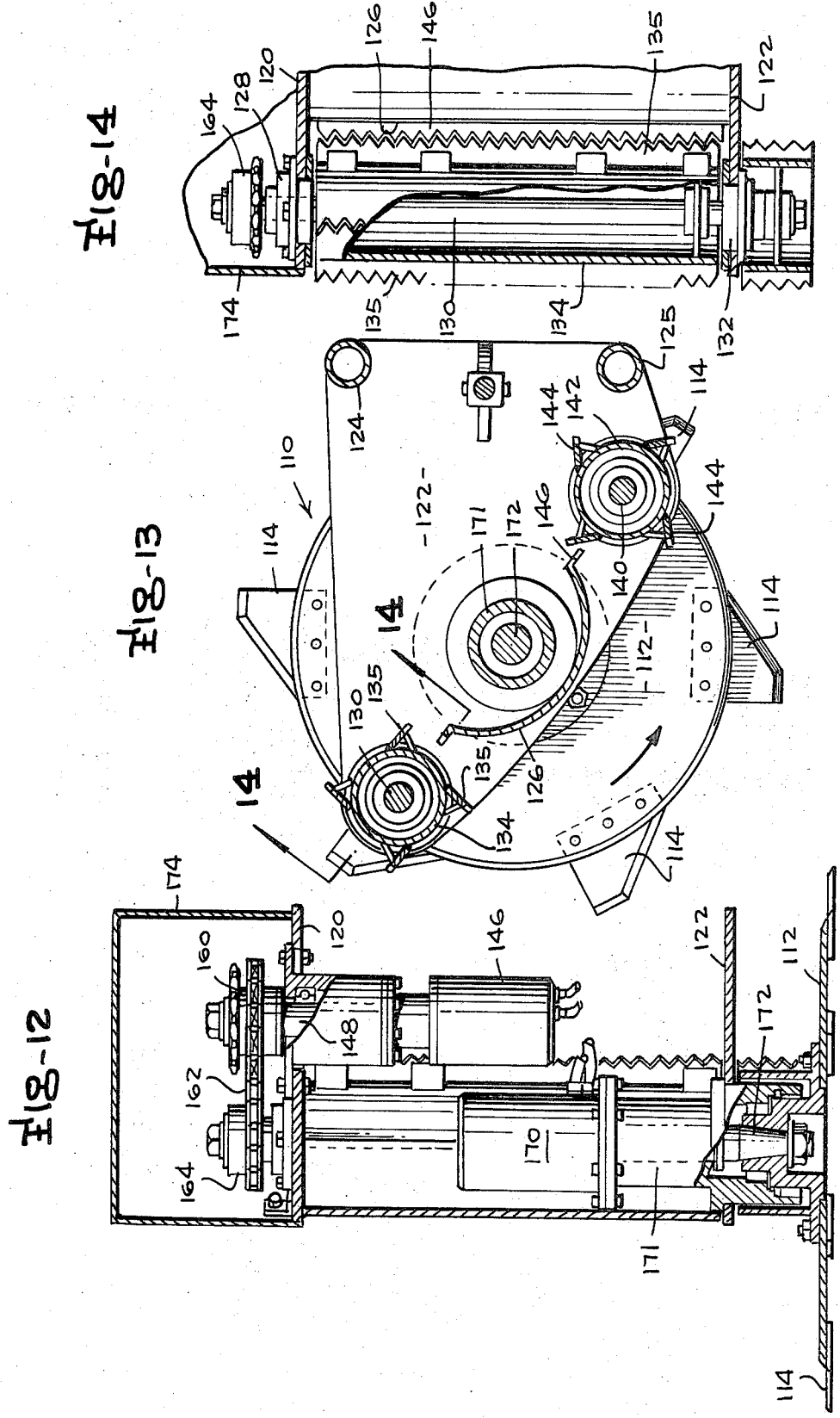

TWO ROW CUTTER WINDROWER HARVESTING MACHINE

This invention is in the field of agricultural equipment and is specifically directed to sugar cane harvesting machinery.

Harvesting of sugar cane is complicated by the fact that the cane frequently becomes recumbent and tangled at or near ground level so as to make it difficult to mechanically sever the cane for harvesting. In addition, it is necessary to remove the cane tops from the cane and these tops should be kept separate from the harvested cane stalks since they are detrimental to the milling of the cane. Additionally, it is desirable that the cane harvesting equipment operate without uprooting the cane root system during the forward movement of the machine as the cane is being severed.

Prior known sugar cane harvesters have not solved the above-discussed problems for a variety fo reasons. For example, while some prior known harvesters have been provided for simultaneously harvesting two adjacent rows of cane, such harvesters have deposited the harvested cane in two windrows, one for each row of cane being harvested, and there is consequently little room left for deposit of the cane tops away from the windrows in order to avoid a mixing of the tops with the windrows. Additionally, prior known sugar cane harvesting machines have deposited the cane in random orientation with the cane being positioned at varied angles in the particular windrow with the consequent result that the cane is more difficult to remove from the field. Additionally, the non-uniform orientation of the severed cane can result in bending and breakage of the cane during further handling to the consequent detriment of the cane quality.

Moreover, the mixing of the cane tops with the windrows frequently requires an additional cleaning process in the field prior to conveyance of the cane to the mill. Also, the field must be hand-cleaned following a harvest and the expense of this labor adds substantially to the overall harvesting cost.

Other cane harvesters have been employed in which the cane is deposited perpendicular to the line of travel of the harvester along the sides of the machine. However, devices of this type do not maintain uniformity of the windrowed cane since it falls more or less at random and consequently occupies a substantial amount of field space. The lack of uniformity of the windrow of prior known harvesters along with the fact that all of the prior known harvesters provide a single windrow for each row of cane so that the windrow occupies a substantial portion of the field surface leaving little area available for the cane tops constitutes two major problems with respect to the prior known harvesting machines which this invention solves.

Therefore, it is the primary object of the subject invention to provide a new and improved sugar cane harvesting device.

Obtainment of the object of this invention is enabled through the provision of a tracked vehicle which supports harvesting equipment for movement along two parallel cane rows. The harvesting equipment for each row comprises an inclined parting scroll extending forwardly with its forward end adjacent ground level and having a spiral flange that is constantly rotated for movement beneath matted recumbent cane to cooperate with an adjacent cane lifting shield to lift the cane upwardly toward vertical orientation so that a pair of spaced feed chains at a higher level above the parting scroll can engage the cane tops for inward movement into the machine in conjunction with the forward machine movement. A parting knife is provided adjacent the rearmost end of the parting scroll for severing cane tangles incapable of being moved into vertical orientation by the scroll and lifting shield so as to prevent uprooting of these cane members as would occur absent severing of the recumbent cane. The upwardly positioning guide chains guide the cane to cane topping means which severs the cane tops from which the tops are deflected downwardly to be guided to fall in front of one of the tracks of the vehicle. Immediately following the severing of the cane tops, the cane bottoms are severed adjacent ground level by a rotating cutting disc. A pair of kicker rolls are provided immediately above each of the lower cutting discs which rolls are driven by hydraulic motors to deflect the severed cane from both of the rolls inwardly into a cane positioning trough in the form of an inverted U-shaped passageway into which the cane is deflected and oriented in parallel orientation extending parallel to the line of travel of the machine and to the cane rows being harvested. The cane from both of the rows is deflected inwardly into a single windrow so that substantial field surface comprising the space between every other row remains for the cane tops and other trash which are deposited beneath the tracks of the vehicle travelling in this open space. The tops and other trash are ground into the soil to inhibit mixing of the trash and tops with the harvested cane in the single windrow.

Consequently, a single windrow is provided for the two rows of cane being harvested with all of the cane in the single windrow being oriented parallel to the path of travel of the vehicle in a uniform manner to enable an efficient mechanical harvesting of the windrow with little or no damage of the cane therein.

A better understanding of the nature and operation of the preferred embodiment of the invention will be enabled when the following written description is read in conjunction with the appended drawings, in which:

FIG. 1 is a perspective view of the preferred embodiment;

FIG. 2 is a top plan view of the preferred embodiment;

FIG. 3 is a side elevational view of the preferred embodiment;

FIG. 4 is a sectional view taken along lines 4—4 of FIG. 3;

FIG. 5 is a sectional view taken along lines 5—5 of FIG. 1;

FIG. 6 is a sectional view taken along lines 6—6 of FIG. 5;

FIG. 7 is an enlarged top plan view of cane top severing means;

FIG. 8 is a sectional view taken along lines 8—8 of FIG. 7;

FIG. 9 is a sectional view taken along lines 9—9 of FIG. 8;

FIG. 10 is a sectional view taken along lines 10—10 of FIG. 4;

FIG. 11 is a sectional view taken along lines 11—11 of FIG. 10;

FIG. 12 is a sectional view taken along lines 12—12 of FIG. 11;

FIG. 13 is a sectional view taken along lines 13—13 of FIG. 10; and

FIG. 14 is a sectional view taken along lines 14—14 of FIG. 13.

Attention is initially invited to FIGS. 1, 2 and 3 of the drawings which illustrate the preferred embodiment of the invention and which generally comprises a vehicle 10 having first and second motor driven track members 12 and 14 driven by an internal combustion engine mounted at the rear of the vehicle in a housing E (FIG. 3). Track members 12 and 14 are driven in a conventional manner under the control of an operator seated in a seat 16 on an elevated platform 18 centrally of the vehicle.

Vehicle 10 includes a unitary main frame member providing support for the remainder of the apparatus and including three vertical frame members 19, 20 and 21 extending upwardly inwardly of each of the track members and two horizontal support frames 22 each respectively located to one side adjacent one of the track members and connected to the tops of vertical members 19, 20 and 21. Transverse frame members 26, 28, 30 and 32 extend between frame members 22 and support for platform 18 is provided by forward posts 36 extending upwardly from the frame member 26 and rearward posts 38 extending upwardly from transverse frame 28 with braces 40 being provided between frames 22 and the top of posts 38. In addition, track roller frame members 34 are provided adjacent the base of each of the track members 12 and 14 in a well-known manner for providing support for track rollers and other portions of the machine as will be discussed hereinafter.

Cane positioning and guiding means are provided extending forwardly from the vehicle for engaging cane in first and second parallel rows R1 and R2 as the vehicle moves forwardly to the left as viewed in FIG. 1 with the positioning and guiding means including lower cane portion engaging means generally designated 40 and upper cane top engaging means generally designated 42 as best shown in FIG. 1. Duplicate means for engaging the cane are provided for each row of cane. The cane engaging means on the righthand side of the vehicle will be discussed in detail; however, it should be understood that the cane engaging means on the lefthand side of the vehicle (as viewed from the driver's forward facing position) is identical and in mirror relationship to the apparatus on the righthand side of the vehicle. The numerical designators for the cane handling apparatus on the left side of the vehicle are primed with like designators corresponding to the designators discussed with respect to the parts on the righthand side of the vehicle.

The lower cane portion engaging means 40 is pivotally connected to the roller frame member 34 for unitary pivotal movement about a pivot pin 44 under the control of a hydraulic cylinder 46 with the forward end of the entire pivotal unit being normally supported by ground engaging wheels 48. Internal bracing members 49, 51, 53, 55 and 57 of the lower cane portion engaging means 40 are enclosed by a sheet metal shroad 52 which includes an inwardly facing cane guide surface 50 which rides along the outer side of each of the rows of cane as illustrated in FIG. 1.

A pivotal scroll 54 and an associated cane lifting shield 56 are mounted for unitary pivotal movement about a pivot 59 in a bracket 58 as shown in FIG. 5. Pivotal movement of the scroll 54 is effected by means of a hydraulic cylinder 60 connected between a bracket 62 on the internal frame member 55 and a bracket 64 extending downwardly from an elongated scroll support frame member formed of two box frame members 66 connected by a base plate 68 as shown in FIG. 6.

An angle plate 70 welded across the upper ends of box frame members 66 provides support for a rotary bearing 72 through which a scroll supporting stub-shaft 74 extends. Stub-shaft 74 supports the upper end of the scroll member 54 which is in the form of a cylinder 76 from which a radially outwardly extending spiral flange 78 extends.

The lower end of cylinder 76 is supported by a rotary bearing 80, a stub-shaft 82 extending through the bearing 80 and a bearing supporting frame plate 84 extending across and downwardly from the lower ends of the box frame components 66.

Additionally, the forwardmost lower end of the stub-shaft 82 supports a conical sleeve 86 of relatively short length from which a spiral flange 88 extends so that the sleeve 86 and the cylinder 76 rotate as a unit in an obvious manner.

The conical sleeve 86 is shaped so as to move beneath tangles of broken or bent cane, for lifting such non-vertical cane from the ground to move upwardly along the scroll due to rotation of the scroll effected by means of a hydraulic motor 90 connected to the upper end of stub-shaft 74 by means of a sleeve connector 91.

In addition, a hydraulic motor 100 is provided on a bracket 101 fixed to the upper ends of the box frame members 66 for driving a parting knife 102 in the form of a rotating disc 104 having radial blades 106. Cane lifting shield 56 extends downwardly and inwardly from the box frame members 66 for aiding in the guiding of tangle cane masses and the like upwardly toward the parting knife 102 in a manner to be discussed in detail hereinafter.

The rear portion of the cane guide surface 50 is provided with outwardly extending cane positioning protrusion 108 for guiding cane into a cane bottom severing and kicker unit generally designated 110 provided for each row immediately to the rear of protrusion 108. The cane bottom severing and kicker unit 110 includes a rotary driven cutter disc 112 having radial blades 114.

The cutter-kicker unit 110 includes a frame comprising pipe standards 124, 125 and an arcuate deflector plate 126 extending between an upper frame plate 120 and a lower frame plate 122. The unit 110 is supported from the main vehicle frame by forwardly extending cantilever arms comprising a pair of upper arms 116 and a pair of lower arms 118 with the outer ends of the arms including slide bearings in which standards 124 and 125 are mounted for axial slidable movement. Vertical adjustment of the entire cutter-kicker unit 110 is achieved by means of an hydraulic cylinder 136 supported from a central bracket 137 and having a piston rod connected at its lower end to a bracket attachment member 138 fixed to the lower frame plate 122. Actuation of cylinder 136 serves to either lift or lower the entire unit through the sliding action of the standards 124 and 125 in the side bearings on the outer ends of the cantilever members 116 and 118.

The upper frame plate 120 is provided with a bearing 128 through which a shaft 130 extends. The lower end of shaft 130 extends through a bearing 132 in the lower frame plate 122 as best shown in FIG. 14. Shaft 130 supports a deflector cylinder 134 which is provided with a plurality of axially parallel flange members 135 having a serrated sawtooth edge passing adjacent a similar sawtooth edge formed in the deflector plate 126. In like manner, a second shaft 140 supports a cylinder 142 identical to cylinder 134 and having sawtooth flanges 144. The flanges 144 cooperate with a second sawtooth edge flange 146 forming the edge of the deflector plate 126 adjacent the cylinder 142.

Drive to the shaft members 130, 140 and their associated deflector cylinders is provided by means of a hydraulic motor 146 (FIG. 12) supported beneath the upper frame plate 120 for driving a shaft 148 to the upper end of which is connected a double sprocket output drive 160. A chain 162 extends from double sprocket 160 to an input drive sprocket 164 mounted on the upper end of shaft 130 and a second chain 166 extends from the double sprocket 160 to drive an input sprocket 168 on the upper end of shaft 140; consequently, it will be seen that the output from the hydraulic motor 146 drives the kicker rolls at a constant speed in the same direction. Chains 162, 169 etc. are enclosed in a protective housing 174.

Similarly, a hydraulic motor 170 (FIG. 12) is supported above the lower frame plate on the upper end of a bearing standard 171 within the curvature of deflector plate 126 (FIG. 13) and has an output shaft 172 extending downwardly through plate 122. The cutter disc 112 is attached to the lower end of the shaft 172 so that power from the motor 170 serves to rotate the disc 112 to provide a shearing action for the radial blades 114 in an obvious manner.

The cane guiding means includes cane top engaging means for each row and the means associated with the lefthand row R2 will be described with it being understood that the cane top engaging means of the righthand row is identical to and in mirror relation to the cane top engaging means of the lefthand row with the numerical designators for the parts of the righthand row being non-primed and those of the lefthand row being primed. The means of the lefthand row includes power driven guide chains 176' and 178' which extend forwardly at an upper level for engaging the tops of the cane as the vehicle moves forwardly. Chain 176' is supported by main frame arm 180' including idler sprockets 181' and elongated slotted metal chain guides 183' with arm 180' being connected at its rearmost end to a pivot base frame generally designated 182' (FIG. 8) which includes a U-shaped member formed of top plate 184' and a bottom plate 186' connected by an end plate 185'. Frame arm 180' is connected to top plate 184' by a spacer plate 188'.

A pair of pivot pin supporting arm plates 190' extend upwardly from the rearmost edge of the upper or top plate 184' adjacent the side edges thereof and retain a pivot pin 192' pivotally extending through an aperture in the ends of a pivot link arm 194' sandwiched between each pair of plates 190' as best illustrated in FIGS. 7 and 8. Additionally, main bracket support plates 196' extend upwardly from the rearmost edge of the top plate 184' for supporting a main support pivot pin 198' to which a main support rod 200' is pivotally connected by means of a sleeve 202' mounted on the end of arm 200'. A second frame arm 204' including idler sprockets 205' and elongated slotted metal guides 206' extends forwardly from the lower surface of the bottom plate 186' for supporting the chain 178'.

Drive motion is imparted to the chains 176' and 178' by means of a hydraulic motor 210' fixed to the upper surface of top plate 184' and having an output shaft 211' to which a gear 212' is keyed. Gear 212' meshes with a second gear 214' on a shaft 216' to which is also keyed an output sprocket 218'. Chain 176' extends over the sprocket 218' and is consequently driven thereby. In like manner, the lower end of shaft 211' is provided with an output drive sprocket 220' over which the chain 178' extends.

The chain arrangement is such that the chains 176' and 178' define an inwardly converging slot from front to rear with the chains being driven in the direction of the arrows as shown in FIG. 2 so as to guide the cane in row R2 inwardly between the two chains for rearward movement toward a cane top cutting disc 230' having radial cutting blades 232' and curved deflector plates 233' on its upper surface. Cane top cutting disc 230' is driven by means of the output shaft of a hydraulic motor 235' mounted beneath a motor support plate 238' which is welded to the top forward edges of two L-shaped plates 239' and 240'. A top deflector shield 243' curves around and behind the cane top cutting disc 230' so that the operation of the cane top cutting disc 230' serves to sever the tops from the cane clamped between the chain flights with the severed tops 242' being deflected around to fall in front of the track 14 so that the track consequently moves over the cane tops to compress them into the soil and prevent mixing with the windrow being formed by the machine. A slide surface 246' aids in depositing the cane tops and other trash in front of track 14.

It is to be noted that the rear ends of the pivot link arms 194' are pivotally connected to fixed upright arm means 250' by pins 252' (FIG. 3) while the rearmost end of the main support rod 200' is pivotally connected by a pin 256' to a frame member 28''. A hydraulic cylinder 260' serves to pivot the members 200' and 194' upwardly and downwardly to adjust the vertical position of the guide chains in an obvious manner.

It is again noted that the foregoing discussion has been limited to the lefthand upper cane top guiding and severing means; however, the righthand means is in mirror relation to the lefthand means and is identical thereto in operation.

An inverted cane positioning trough 269 for receiving severed cane and orienting it into a windrow parallel to the rows is provided to the rear of the cutter-kicker members and comprises side walls 270 and a top wall panel 274 with an inclined cane top deflector sheet 280 extending upwardly at an approximate 45° angle from the top panel 274.

Operation of the machine is initiated by movement of the vehicle along the surface of the field with the respective righthand and lefthand row harvesting equipment being associated with the rows R1 and R2 as shown in FIGS. 1 and 2 with the rows being positioned immediately inward of the parting scrolls 54 and 54'. Forward movement of the vehicle moves the forward conical sleeve portions 86 and 86' of the scroll units beneath recumbent cane so that rotation of the scrolls in conjunction with the operation of the cane lifting shields 56 and 56' lifts the cane upwardly from ground level into substantially vertical orientation to be engaged by the chains 176, 178 of the right-hand unit and the chains 176' and 178' of the lefthand unit. It should be noted that a substantial portion of the cane is already in erect condition and merely moves into engagement with the guide chains which are driven so that their inwardly facing flights move inwardly in the direction of the arrows as shown in FIG. 2, for example. In any event, any tangles or mats of cane that are not moved into an upright position will extend outwardly over the scroll members so that they will ultimately engage the parting knife blades 106 and 106' and be severed to avoid uprooting of the cane roots.

The cane tops engaged by the upper chains 176,178 etc. move rearwardly with continued forward progress of the vehicle so that the cane tops become firmly held by the chain members. The cane topping knives comprising discs 230 and blades 232 etc. engage the tops of the cane carried by the cooperating chain members 176, 178 and sever the cane tops 242 from the remainder of the cane members with the cane tops then being deflected to fall beneath the tracks 12 and 14. Immediately after the cane tops have been severed from the stalks, the cane bottom severing means comprising the discs 112 and 112' mounting the radial blades 114 and 114' respectively, sever the cane of each row at or near the ground line. The force of the cutting movement of the blades 114 and 114' and the kicker rolls 134, 142 etc. deflects the base of the severed stalks inwardly into the inverted cane positioning trough 269 with the tops of the cane striking the inclined cane top deflector shield 280 so that all of the cane from both of the rows is positioned in a windrow W extending parallel to the rows and the direction of movement of the vehicle as clearly shown in FIG. 1.

Therefore, it will be seen that the machine provides a single windrow W formed from two rows of cane so that a substantially clear area for receipt of the severed cane tops 242 is provided. The severed tops fall downwardly in front of the tracks 12 and 14 to be pressed into the ground and run over by the track members during continued forward progress of the vehicle. Therefore, there is little or no mixing of the cane tops 242 with the windrow as will be evident from inspection of FIG. 1.

Numerous modifications of the subject invention will undoubtedly occur to those of skill in the art; however, it is to be understood that the spirit and scope of the invention is to be limited solely in light of the appended claims.

I claim:

1. A cane severing machine for severing cane from two adjacent parallel rows and for subsequently orienting the severed cane in a single windrow between the two adjacent rows with the individual cane members extending parallel to the two rows, said machine comprising a power driven vehicle, cane positioning and guiding means mounted on the forward portion of said power driven vehicle for engaging the cane of each row and positioning and holding the cane for engagement with a cane bottom severing means for each row carried by the vehicle adjacent ground level for severing the cane of each row a small distance above ground level and severed cane deflecting and guiding means including two driven kicker rolls associated with each of the cane bottom severing means of each row for deflecting and guiding the severed cane into a single windrow extending parallel to and between the two rows from which the cane is being severed.

2. The invention of claim 1 wherein said cane positioning and guiding means includes first and second inclined parting scroll means positioned with a forward end adjacent ground level in conjunction with each of the respective cane rows and power drive means for rotating said parting scroll means.

3. The invention of claim 2 additionally including cane topping means for severing the tops of the cane of each of said rows prior to the severing of the lower ends of the cane.

4. The invention of claim 3 wherein said cane positioning and guiding means includes a pair of power driven chain members positioned to define a converging slot associated with each row of cane for guiding and holding the top portions of the cane of the respective rows with said cane topping means being positioned adjacent the rearmost portion of said slot for each of the rows.

5. The invention of claim 4 wherein said cane bottom severing means comprises a rotary disc having radially extending cutter blades.

6. The invention of claim 1 wherein the cane bottom severing means for each row comprises a rotary cutter disc oriented in substantially a horizontal plane and driven by power motor means.

7. The invention of claim 6 wherein said kicker rolls are mounted above their respective rotary cutter discs with their axes of rotation being parallel to the axis of rotation of said cutting discs.

8. The invention of claim 7 additionally including an inverted U-shaped trough positioned immediately behind and between the kicker rolls so that the lower ends of the severed cane are directed into said trough and a deflector shield inclined above the forward end of said trough engaged by the upper ends of the severed cane to deflect the forward ends downwardly to orient the cane in a direction parallel to the direction of movement of the vehicle.

9. The invention of claim 8 wherein said cane positioning and guiding means includes first and second inclined parting scroll means positioned with a forward end adjacent ground level in conjunction with each of the respective cane rows and power drive means for rotating said parting scroll means.

10. The invention of claim 9 additionally including cane topping means for severing the tops of the cane of each of said rows prior to the severing of the lower ends of the cane.

11. The invention of claim 10 wherein said cane positioning and guiding means includes a pair of power driven chain members positioned to define a converging slot associated with each row of cane for guiding and holding the top portions of the cane of the respective rows with said cane topping means being positioned adjacent the rearmost portion of said slot for each of the rows.

12. The invention of claim 11 additionally including tangle parting severing means mounted adjacent the rearmost end of said parting scroll means for severing badly tangled cane to prevent uprooting of such tangled cane by continued forward motion of the vehicle.

13. The invention of claim 12 wherein said cane positioning and guiding means additionally includes a lifting shield means extending inwardly adjacent each of said parting scroll means along a substantial portion of the length thereof for lifting and guiding fallen cane upwardly into said parting scroll means.

14. The invention of claim 1 additionally including cane topping means for severing the tops of cane of each of said rows and guiding and deflecting means for guiding the severed cane tops downwardly for deposit on the ground immediately outward of the two rows being harvested.

15. The invention of claim 14 wherein said power driven vehicle includes ground engaging power driven track means for enabling movement of the vehicle over the field.

16. The invention of claim 15 wherein said severed tops are deposited immediately in front of the track means of the tracked vehicle to be overrun by subsequent forward movement of the vehicle.

17. The invention of claim 16 wherein said cane positioning and guiding means includes first and second inclined parting scroll means positioned with a forward end adjacent ground level in conjunction with each of the respective cane rows and power drive means for rotating said parting scroll means.

18. The invention of claim 17 wherein said cane positioning and guiding means includes a pair of power driven chain members positioned to define a converging slot associated with each row of cane for guiding and holding the top portions of the cane of the respective rows with said cane topping means being positioned adjacent the rearmost portion of said slot for each of the rows.

19. The invention of claim 18 wherein said cane bottom severing means comprises a rotary disc member, radially extending cutter blades extending outwardly from said rotary disc member and motor means for rotating said rotary disc member.

20. The invention of claim 19 wherein said cane positioning and guiding means includes rotary cane deflector rolls having radially extending deflector plates extending upwardly above said rotary cutter discs of each of the cane bottom severing means.

21. The invention of claim 19 additionally including tangle parting severing means mounted adjacent the rearmost end of said parting scroll means for severing badly tangled cane to prevent uprooting of such tangled cane by continued forward motion of the vehicle.

22. The invention of claim 21 wherein said cane positioning and guiding means additionally includes a lifting shield means extending inwardly adjacent each of said parting scroll means along a substantial portion of the length thereof for lifting and guiding fallen cane upwardly into said parting scroll means.

23. A cane harvesting machine for harvesting cane from two adjacent parallel rows and for providing the harvested cane from both rows in a single windrow extending parallel and between the two adjacent rows, said machine comprising a power driven vehicle having a vehicle frame, cane top severing means for severing the tops from the cane of both rows, a cutter-kicker unit positioned adjacent each row for severing the bottom of the cane of each row at or near ground level and kicking the severed cane into a deflecting and orienting means for positioning the cane from both rows in a windrow between the two rows with the individual cane components of the windrow extending parallel to the two rows wherein said cutter-kicker units each comprises a horizontal cutting disc, first and second kicker rolls positioned above said cutting disc with their axes parallel to the axis of rotation of said cutter disc and power means for rotating said kicker rolls and said cutter disc.

24. The invention of claim 23 additionally including deflector means for deflecting the severed cane tops into positions outward of and adjacent the rows from which the cane tops are severed.

25. The invention of claim 24 additionally including lifting and orienting means for lifting recumbent cane into substantially a vertical position to enable the cutting of the tops from the lifted cane.

26. The invention of claim 25 additionally including upper guide means for receiving the upper ends of the cane for guiding the cane into cane top severing means and for holding the cane until the cutter-kicker unit severs the cane at or near ground level.

27. A cane severing machine for severing cane from two adjacent parallel rows and for subsequently orienting the severed cane in a single windrow between the two adjacent rows with the individual cane members extending parallel to the two rows, said machine comprising a power driven vehicle, cane positioning and guiding means mounted on the forward portion of said power driven vehicle for engaging the cane of each row and positioning and holding the cane for engagement with a cane bottom severing means for each row carried by the vehicle adjacent ground level for severing the cane of each row a small distance above ground level, said cane positioning and guiding means including first and second inclined parting scroll means positioned with a forward end adjacent ground level in conjunction with each of the respective cane rows and power drive means for rotating said parting scroll means, a pair of power driven chain members positioned to define a converging slot associated with each row of cane for guiding and holding the top portions of the cane of the respective rows, cane topping means positioned adjacent the rearmost portion of each of said converging slots for severing the tops of the cane of each of said rows prior to the severing of the lower ends of the cane, said cane bottom severing means comprising a rotary disc having radially extending cutter blades and rotary cane deflector rolls having radially extending deflector blades extending upwardly above said rotary cutter disc of each of said cane bottom severing means for guiding the severed cane into a windrow extending parallel to and between the two rows from which the cane is being severed.

28. The invention of claim 27 additionally including tangle parting severing means mounted adjacent the rearmost end of said parting scroll means for severing badly tangled cane to prevent uprooting of such tangled cane by continued forward motion of the vehicle.

29. The invention of claim 28 wherein said cane positioning and guiding means additionally includes a lifting shield means extending inwardly adjacent each of said parting scroll means along a substantial portion of the length thereof for lifting and guiding fallen cane upwardly into said parting scroll means.

* * * * *